United States Patent [19]

O'Leary

[11] Patent Number: 5,614,971
[45] Date of Patent: Mar. 25, 1997

[54] MECHANISM AND METHOD FOR DETERMINING WHEN PHOTOGRAPHIC FILM HAS BEEN COMPLETELY REWOUND

[75] Inventor: Beth A. O'Leary, Rochester, N.Y.

[73] Assignee: Eastman Kodak Company, Rochester, N.Y.

[21] Appl. No.: 444,340

[22] Filed: May 18, 1995

[51] Int. Cl.$^6$ ................................ G03B 1/18; G03B 1/00
[52] U.S. Cl. ................... 396/409; 396/410; 396/284
[58] Field of Search .................... 354/173.1, 173.11, 354/214, 215, 275

[56] References Cited

U.S. PATENT DOCUMENTS

| | | | |
|---|---|---|---|
| 4,373,796 | 2/1983 | Matsuura et al. | 354/173 |
| 4,540,261 | 9/1985 | Matsumoto et al. | 354/173.11 |
| 4,707,095 | 11/1987 | Nakano et al. | 354/173.11 |
| 4,994,833 | 2/1991 | Cocca | 354/207 |
| 5,030,978 | 7/1991 | Stoneham et al. | 354/21 |
| 5,032,854 | 7/1991 | Smart et al. | 354/21 |
| 5,321,455 | 6/1994 | Cocca | 354/207 |
| 5,398,090 | 3/1995 | Ezawa | 354/173.1 |

FOREIGN PATENT DOCUMENTS

0598245A1   5/1994   European Pat. Off. .

*Primary Examiner*—Safet Metjahic
*Assistant Examiner*—Daniel Chapik
*Attorney, Agent, or Firm*—David A. Howley; Charles E. Snee, III

[57] ABSTRACT

A mechanism and method used by photographic systems to determine when film has been completely rewound into a film cartridge so that other operations involving the film cartridge can occur, for example, aligning a visual indicator with an appropriate visual exposure icon visible on exterior of a film cartridge. Preferably, the mechanism and method of the present invention are for use in photographic systems that accept film cartridges having a radial bar code contained on a data disk and means for aligning a visual indicator with an appropriate visual icon. The mechanism and method are characterized in that during rewinding of the film, sensing the leading edge of the film causes the number of film spool rotations to be counted. After a predetermined number of rotations have occurred, it is presumed that the film is completely rewound on the film spool and, as a result, a predetermined parking sequence can be initiated.

9 Claims, 5 Drawing Sheets

MECHANISM AND METHOD FOR DETERMINING WHEN PHOTOGRAPHIC FILM HAS BEEN COMPLETELY REWOUND

FIELD OF THE INVENTION

The present invention relates to the field of photographic systems, and more specifically, to mechanisms and methods to determine when film has been completely rewound about a film spool contained within a film cartridge so that other operations involving the film spool and/or film cartridge can occur.

BACKGROUND OF THE INVENTION

Thrust film cartridges utilizing film door light traps have been disclosed as an alternative to conventional film cartridges utilizing plush light traps. Typical thrust film cartridges include an outer shell having a longitudinally-extending opening for allowing for the exit of film from the cartridge. A cartridge spool is rotatably positioned within the outer shell to accommodate a roll of film. A film door is rotatably mounted adjacent the opening and is movable between a closed position, wherein a light tight seal is formed, and an open position, wherein film is allowed to exit the cartridge.

Thrust film cartridges are particularly useful for allowing rewinding and subsequent reloading of the film before the complete roll of film is used. Cameras having the ability to rewind and reload partially-used rolls of film are sometimes referred to as mid-roll interrupt cameras. Such a camera is disclosed in commonly-assigned U.S. Pat. Nos. 4,947,197 to Smart et al. and 4,965,600 to Smart et al., which are incorporated in their entirety herein by reference.

Unlike conventional film cartridges, thrust film cartridges have no film leader extending out of the cartridge to indicate that the film is unexposed. Consequently, some other means is necessary to provide an indication of whether unexposed frames exist on the film contained within the film cartridge. One such means is a visual exposure indicator visible to the camera user from the exterior of a film cartridge, as disclosed in various forms in commonly-assigned U.S. Pat. Nos. 4,994,833 to Cocca, 5,321,455 to Cocca, 5,030,978 to Stoneham et. al. and 5,032,854 to Smart et. al., which are incorporated in their entirety herein by reference. Generally, the visual exposure indicator is disposed on a film spool contained within the film cartridge and useful icons are disposed on the exterior of the film cartridge. Thus, the film spool can be rotated to align the visual exposure indicator with the appropriate visual icon. For example, a visual exposure indicator, such as an arrow, can be aligned with icons on the exterior of the film cartridge, for example, the letters U (for "unexposed"), P (for "partially exposed") or E (for "exposed") to provide the camera user a visual indication of the exposure condition of the film within the cartridge. Similarly, film cartridges can be provided with icons designating the "unexposed" and "exposed" exposure statuses. Additionally, other visual indicators can be used with other icons to indicate useful film information, including whether the film contained within the film cartridge has been processed. Aligning the visual indicator or indicators occurs by stopping film spool rotation when the visual indicator or indicators are aligned with the appropriate visual icon.

Generally, other operations involving the film spool and/or film cartridge, including for example, positioning the film spool to align the visual indicator or indicators, are referred to as "parking" the film spool.

The film cartridges disclosed by the above-referenced patents have a radial bar code disposed on a data disk positioned at an axial end of the film cartridge. The data disk is rotatable with the rotation of the film spool contained within the film cartridge during film advancement and rewind. The radial bar code represents information concerning the film contained within the film cartridge, including, among other things, the film speed, film type and total number of frames on the film. The radial bar code is typically read by the use of an optical sensor disposed adjacent to the radial bar code. As the position of the icons on the film cartridge are fixed relative to the positioning of the film cartridge within a loading chamber, the radial bar code, in conjunction with the optical sensor, can be used to park the film spool.

Generally, the film spool is parked after the film has been completely rewound into the film cartridge and before the film cartridge is made available to the camera user. However, the above identified patents make no provision as to determining when the film is completely rewound about the film spool contained within the film cartridge so that parking of the film spool can take place. It is therefore desirable to provide a mechanism and method, that will cooperate with a film cartridge having a radial bar code contained on a data disk and a means for parking a film spool, for determining when the film is completely rewound and for initiating film spool parking after the film has been completely rewound. It would be desirable to provide a simple, inexpensive mechanism and method for determining that the film is completely rewound before initiating film spool parking. It would be advantageous to use existing camera elements, dedicated to other camera functions, to accomplish the tasks of determining when the film is completely rewound and initiating film spool parking.

SUMMARY OF THE INVENTION

In accordance with the present invention, a mechanism and method are provided for use in a photographic system for determining when film has been completely rewound about a film spool contained within a film cartridge so that other operations involving the film spool and/or the film cartridge can occur. One such operation includes parking the film spool, which can include aligning a visual indicator disposed on the film spool with a visual exposure icon opening disposed on the film cartridge so that the visual indicator is visible through the opening.

In accordance with the present invention, a method is provided that, during rewinding of the film, the leading edge of film is sensed when the film is being rewound about a film spool contained within a film cartridge. After the leading edge of the film is sensed, the number of film spool rotations are counted. After a predetermined number of rotations have occurred, it is presumed that the film is completely rewound on the film spool and, as a result, a predetermined sequence for parking the film spool can be initiated, for example, aligning a visual indicator disposed on the film spool to a visual exposure icon opening on the film cartridge exterior.

In accordance with the present invention, a mechanism is provided that includes a metering sensor and a data disk sensor. The metering sensor is disposed directly adjacent the film when the film is in a film exposure gate. Preferably, the metering sensor is disposed directly adjacent to the film to allow sensing of the perforations in the film. The metering sensor can sense a leading edge of the film as the leading edge passes through the film exposure gate during rewinding of the film. The data disk sensor is disposed adjacent to a data disk disposed on an axial end of a film cartridge. The data disk is rotatable with a film spool contained within the film cartridge when the film cartridge is positioned within a loading chamber. The data disk sensor is designed to sense rotations of the data disk and, thus, rotations of the film spool, during rewinding of the film about the film spool contained within the film cartridge. Alternatively, a switch can be used to sense rotations of the film spool.

Preferably, the mechanism according to the present invention is characterized in that the metering sensor and data disk sensor (or switch) are operatively connected to a counting device (preferably a microprocessor), known to those skilled in the art, such that when the leading edge of the film is sensed by the metering sensor during film rewind, the counting device begins counting the number of film spool rotations. After a predetermined number of rotations, a parking sequence is initiated. For example, the parking sequence can include aligning a visual indicator disposed on the film spool to a visual exposure icon opening on the film cartridge exterior to provide a visual indication of the exposure status of the film contained within the film cartridge.

DETAILED DESCRIPTION

A mechanism and method according to the present invention are for use in any photographic system which uses film cartridges, such as cameras, film development equipment and equipment which allows the viewing and/or printing of processed film contained within a film cartridge. Preferably, the mechanism and method are used with a photographic system having mid-roll interrupt capabilities.

Figure 1:
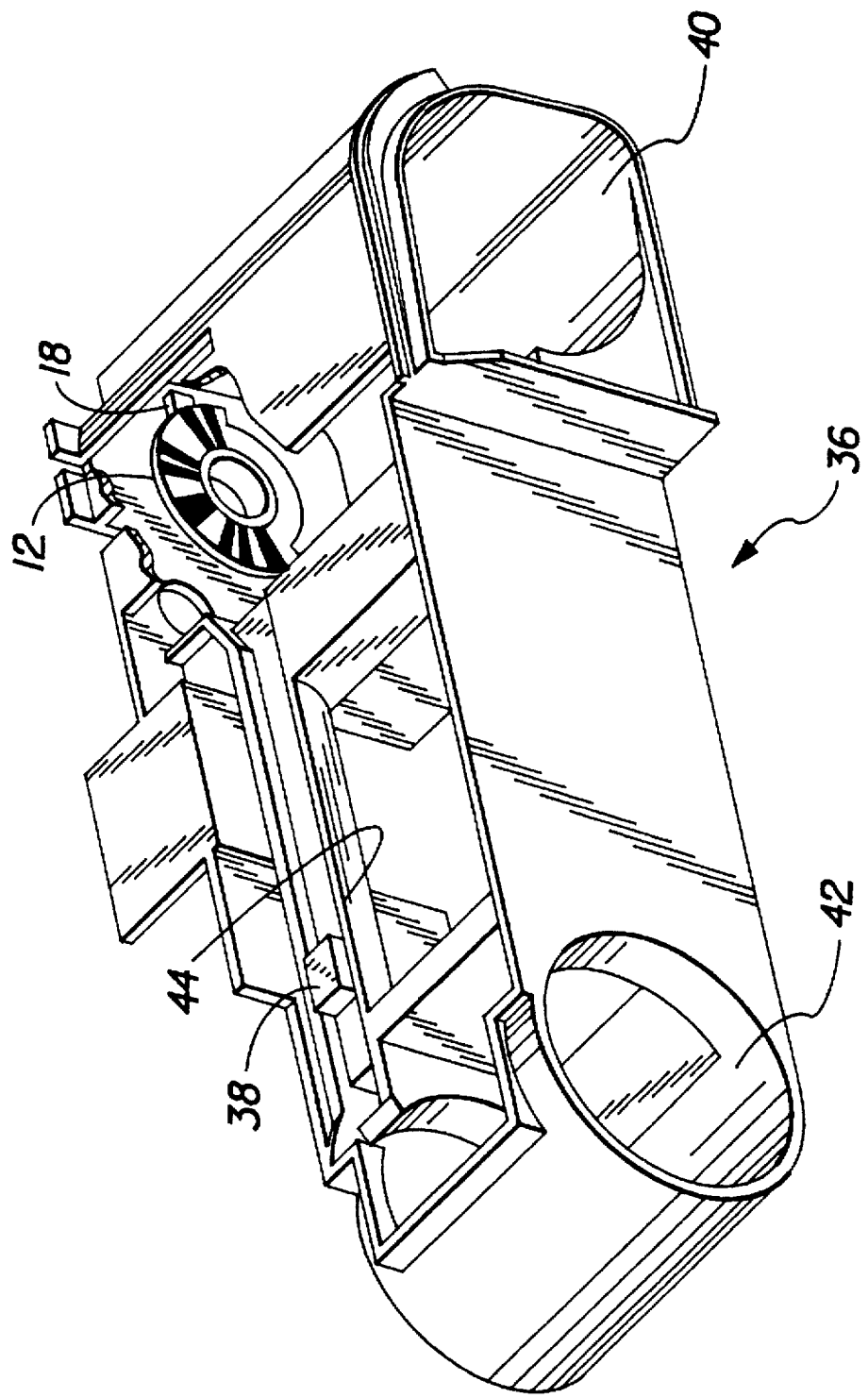
FIG. 1 is perspective view of a camera frame embodying features of one embodiment of the present invention.
Figure 2:
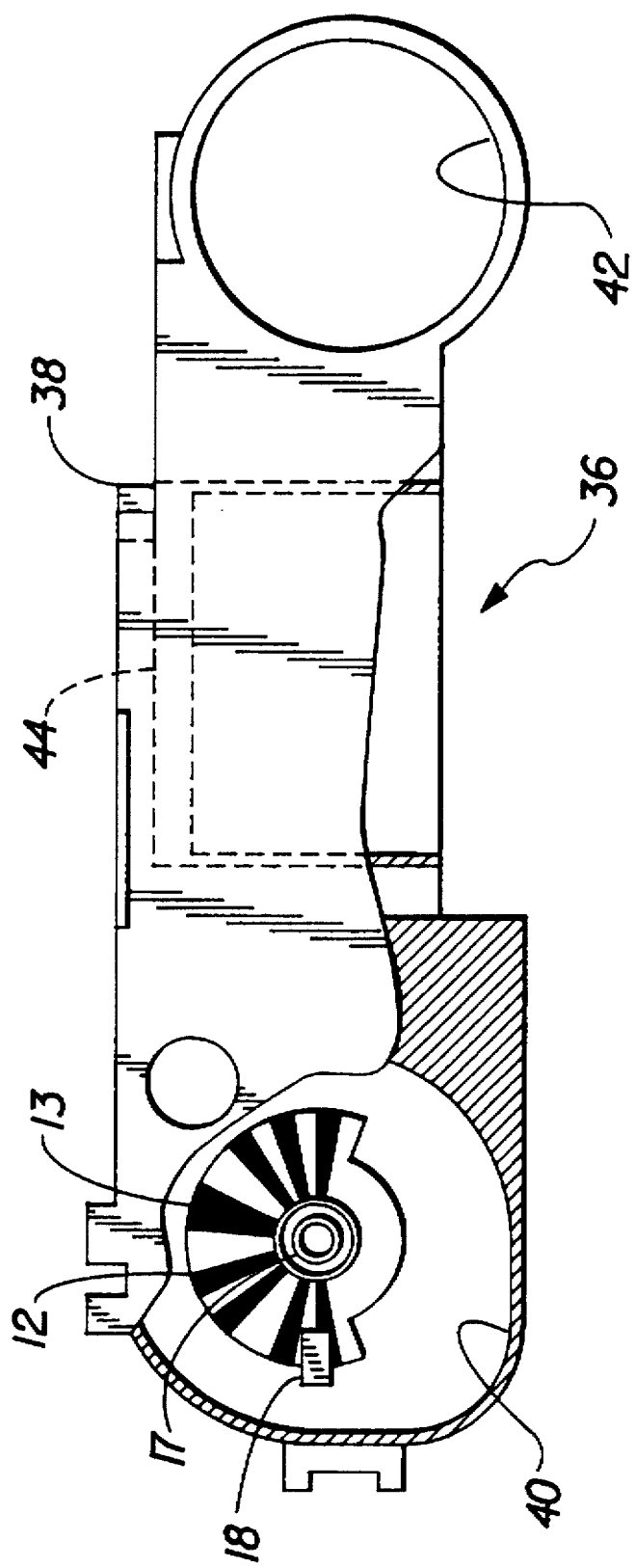
FIG. 2 is a top view of the camera frame shown in FIG. 1.
Figure 3:
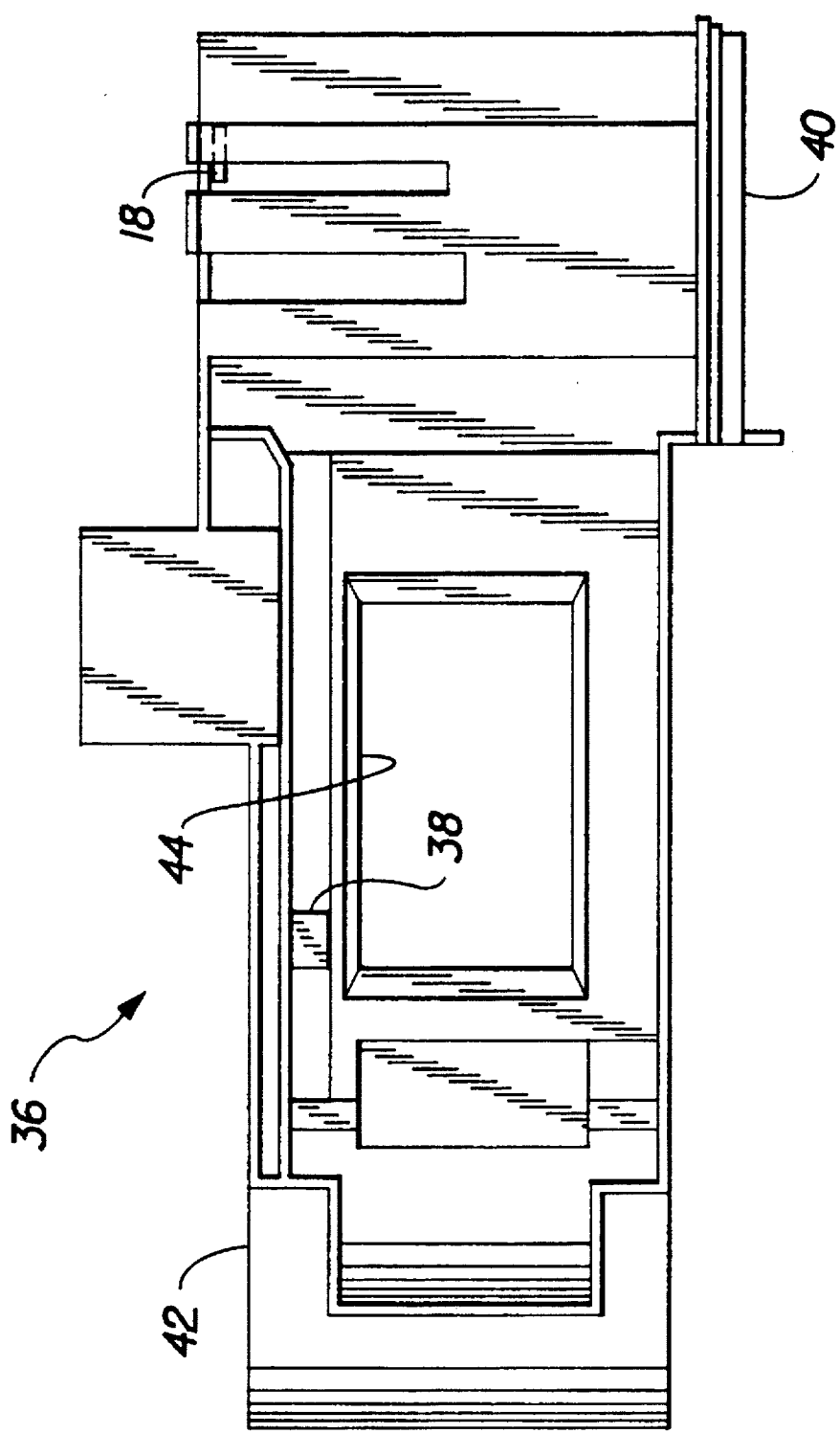
FIG. 3 is a back view of a camera frame shown in FIG. 1.

One embodiment of the present invention is shown in FIGS. 1–3. A camera frame 36 is shown having a loading chamber 40 for receiving a film cartridge (not shown) endwise, i.e. axially, through the opening to the loading chamber 40. The camera frame 36 is also shown having a film exposure gate 44, a take-up spool chamber 42, a data disk sensor 18 and a metering sensor 38.

Figure 4:
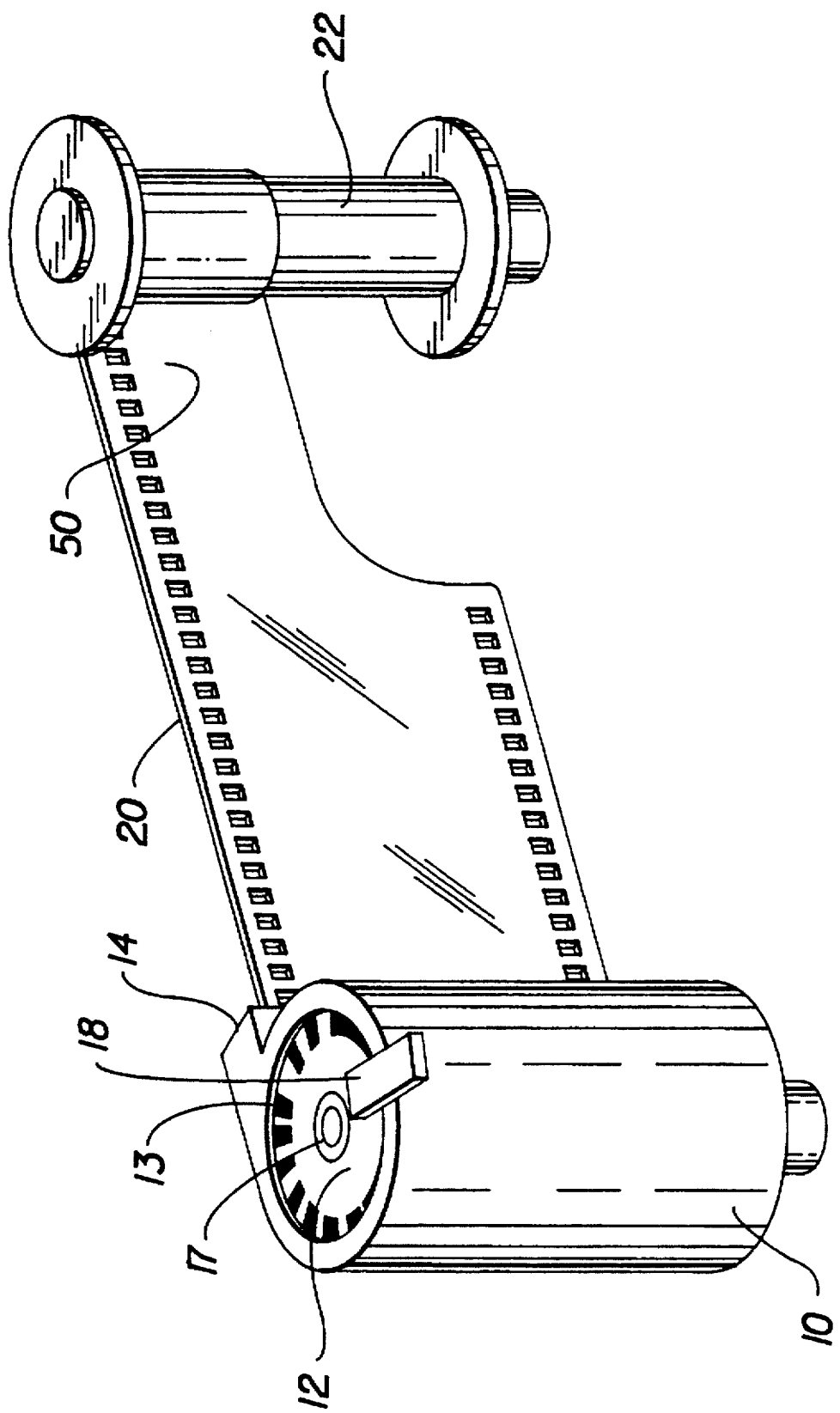
FIG. 4 is a perspective view of a film cartridge, film and film take-spool, showing the relative position of these elements isolated from the camera frame shown in FIG. 1.
Figure 5:
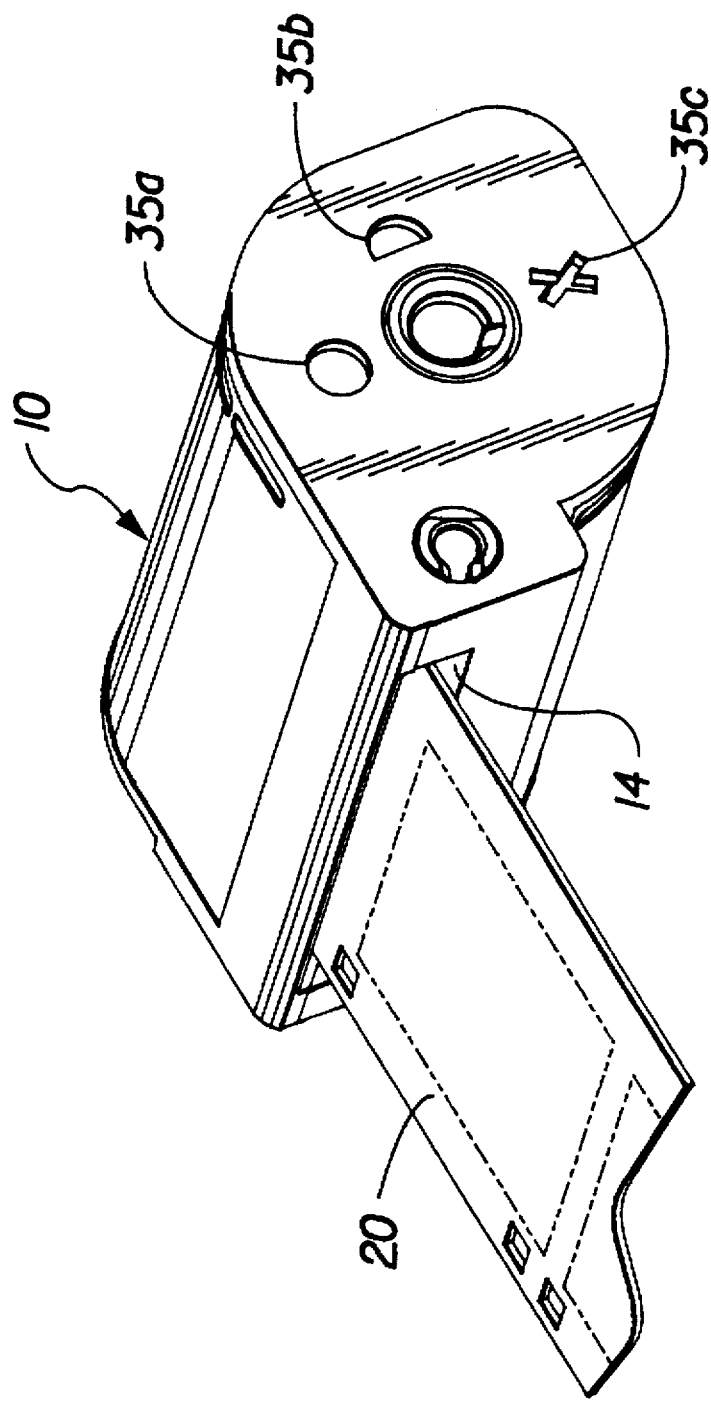
FIG. 5 is a perspective view of a film cartridge, showing visual exposure icon openings on the exterior of the film cartridge.

As shown in FIGS. 4 and 5, the film cartridge 10 includes a film spool 17, a cartridge opening 14, a data disk 12 having a radial bar code 13, an "unexposed" icon opening 35a, a "partially exposed" icon opening 35b and an "exposed" icon opening 35c. A visual indicator is disposed on the film spool 17 within the film cartridge 10 and is visible through one of the icon openings 35a, 35b, 35c to provide the system's user with a visual indication of the exposure status of the film 20 contained within the film cartridge 10. It should be appreciated that other icon openings can be disposed on the exterior of the film cartridge 10. For example, two icon openings representing "unexposed" and "exposed" can be used. Additionally, icon openings other than visual exposure icon openings, can be disposed on the film cartridge 10 to indicates other useful information, including, for example, whether the film 20 contained within the film cartridge 10 has been processed. The data disk 12 rotates with the film spool 17. FIG. 4 shows the data disk sensor 18 apart from the camera frame 36. FIG. 4 also shows the film 20, which includes a film leader 50, partially wound about a take-up spool 22.

With reference to FIGS. 1–3, a film cartridge 10, such as the one shown in FIGS. 4 and 5, is inserted into the loading chamber 40 and the film 20 is advanced from the film cartridge by rotating the film spool 17. In FIGS. 1–3, the data disk 12 is shown but the rest of the film cartridge 10 is not shown. The rotation of the film spool 17 causes the data disk 12 to rotate and the data disk sensor 18 reads the radial bar code 13. Generally, the radial bar code 13 is a predetermined format of alternating bars and spaces which provide a convenient pattern for, among other things, measuring and determining the angular positioning of the data disk 12. Preferably, a 2 of 5 code is used within the radial bar code 13. The angular position of the data disk 12 is defined as the radial angle between the point on the radial bar code 13 being read by the data disk sensor 18 and a reference position on the radial bar code 13. For example, the reference position may be the point of transition between a start code segment and a data code segment on the radial bar code 13.

As noted above, the film cartridge 10 includes the "unexposed" icon opening 35a, the "partially exposed" icon opening 35b and the "exposed" icon opening 35c. Typically, the icon openings 35a, 35b, 35c, will have easily identifiable shapes for the exposure statuses "unexposed," "partially exposed" and "exposed." The visual indicator is aligned with and visible through one of the icon openings 35a, 35b, 35c, (for example, white through the "partially exposed" opening) thereby giving a clear indication of the exposure status. As the visual indicator is disposed on the film spool 17 and the icon openings 35a, 35b, 35c are on the exterior of the film cartridge 10, the visual indicator is set by stopping the rewinding of the film 20, and thus the rotation of the film spool 17, when the visual indicator is aligned with the appropriate icon opening 35a, 35b, 35c.

It should be appreciated that a unique angular position of the radial bar code 13 (and thus, the data disk 12) is associated with the alignment of the visual indicator with each of the icon openings 35a, 35b, 35c. For example, the radial bar code 13 positioned so as to align the visual indicator to be visible through the "unexposed" icon opening 35a, is different from the positions which align the visual indicator to be visible through either the "partially exposed" icon opening 35b or the "exposed" icon opening 35c.

Reading the radial bar code 13, among other things, establishes the beginning angular position of the radial bar code 13. When the film cartridge 10 is inserted into the loading chamber 40, the radial bar code 13 is uniquely positioned relative to the data disk sensor 18 according to the exposure status of the film 20. Preferably, the starting angular position (and thus the exposure status of film 2) is determined from reading the radial bar code 13, as the film spool 17 is rotated to advance the film 20, by determining, for example, the binary code representation resulting from reading the radial bar code 13 and comparing that representation with a reference bit string corresponding to the reference point on the radial disk 13. The angular position and, thus the beginning exposure status, is determined by the relative position of the reference bit stream in the binary code representation.

After advancing the film 20, the film 20 extends from the cartridge opening 14 across the film exposure gate 44 and is wound about the take-up spool 22 seated in the take-up spool chamber 42. The metering sensor 38 is disposed directly adjacent the film 20 when the film 20 is in the film exposure gate 44. Preferably, the metering sensor 38 is disposed directly adjacent to the film 20 to allow sensing of the perforations in the film 20. Preferably, the metering sensor 38 is a light emitting diode and receiver. Preferably, the metering sensor 38, utilizing a perforation transition technique, initially aligns the first usable frame, and thereafter aligns the next usable frame, on the film 20 in the film exposure gate 44.

Upon initiating rewinding of the film 20, the metering sensor 38 monitors the film 20 as the film 20 is rewound about the film spool 17. In the preferred embodiment of a photographic system having mid-roll interrupt capabilities, the metering sensor 38, utilizing a perforation transition technique, counts the number of frames on the film 20. The number of frames is useful in determining the angular position of the radial bar code 13 for parking the film spool 17, for example, in either the "partially exposed" or "exposed" positions. It should be appreciated that if a normal wind camera is used, the number of frames counted represents the number of exposed frames. If a prewind camera is used, the number of frames counted represents the number of unexposed frames. Eventually, the metering sensor 38 senses the leading edge of the film leader 50 of the film 20 as the leading edge passes through the film exposure gate 44. At this point, a portion of the film 20 still remains outside the film cartridge 10.

Before initiating parking of the film spool 17, the remaining portion of the film 20 must be completely rewound about the film spool 17. The number of film spool 17 rotations required to rewind the remaining portion of film 20 is determinable. For example, the information readable from the radial bar code 13 includes the total number of image frames on the film 20. This information is known in view of the reading of the radial bar code 13 which occurs when the film 20 is advanced from the film cartridge 10. Additionally, the diameter of the film spool 17 is also known from predetermined industry specifications and can be stored in a control unit (not shown). Thus, the number of film spool 17 rotations required to rewind the remaining portion of film 20 into the film cartridge 10 is determinable. Alternatively, the number of rotations can be coded onto the data disk 12, or the number of rotations can be stored in the control unit. It will be appreciated that any suitable device as known to those skilled in the art (e.g. a microprocessor-based device) can be utilized for the control functions described herein.

One revolution of the data disk 12 corresponds to one revolution of the film spool 17. Thus, the data disk sensor 18 can be used to track the number of rotations of the data disk 12. Specifically, upon sensing the leading edge of the film leader 50 of the film 20, the metering sensor 38 causes the data disk sensor 18 to start tracking the number of rotations of the film spool 17. The starting point can be located anywhere along the data disk 12. Preferably, the starting position for counting revolutions is at the beginning of a 2 of 5 code of the radial bar code 13.

After a predetermined number of data disk 12 revolutions have been counted by the data disk sensor 18, parking of the film spool 17 occurs. For example, parking the film spool 17 can involve stopping the film spool 17 to align the icon with the appropriate icon opening 35a, 35b, 35c. In view of the number of frames sensed by the metering sensor 38, the exposure status of the film 20 is determinable.

It should be appreciated that if the exposure status is known and the angular position of the radial bar code 13 to align the visual indicator with the icon opening 35a, 35b, 35c, corresponding to the exposure status is known, the film spool 17 can be stopped when the radial bar code 13 is rotated to the appropriate angular position. For example, as described above, the angular position for the film status for "unexposed," "partially exposed" and "exposed" are known relative to a reference point, i.e. the start code sector. Thus, each exposure status is associated with a transition located on the radial bar code 13. Thus, after the required number of film spool 17 rotations have occurred, the data disk sensor 18 next senses the beginning of the start code sector and further senses transitions in the radial bar code 13. After sensing the transition associated with the angular position required, the rotation of the film spool 17 stops. As a result, the visual indicator is visible through the appropriate icon opening 35a, 35b, 35c.

Alternatively, the parking of the film spool 17 can occur mechanically. Specifically, a park switch (not shown), as disclosed in commonly assigned application entitled "PHOTOGRAPHIC SYSTEM FILM DOOR LOCKING MECHANISM," can be provided that indicates that the film spool 17 is positioned to align the visual indicator with, for example, the "exposed" icon opening. Thus, after a predetermined number of data disk 12 rotations have been counted, parking of the film spool 17 can occur when the park switch indicates that the film spool is appropriately positioned. Additionally, the park switch can be used to count film spool rotations.

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the appended claims be construed to include all alternative embodiments as permitted by the prior art.

Parts List For FIGS. 1–5:
10 film cartridge
12 data disk
13 radial bar code
14 cartridge opening
17 film spool
18 data disk sensor
20 film
22 take-up spool
35a "unexposed" visual exposure icon opening
35b "partially exposed" visual exposure icon opening
35c "exposed" visual exposure icon opening
36 camera frame
38 metering sensor
40 loading chamber
42 take-up spool chamber
44 film exposure gate
50 film leader

What is claimed is:

1. Apparatus for use during rewinding of film about a film spool contained within a film cartridge, the film spool including an indicator rotatable with the spool and visible from an exterior of the cartridge, for determining when the film is completely rewound about the film spool and initiating a predetermined parking sequence, said apparatus comprising:

(a) first sensing means for detecting a leading edge of the film during rewinding of the film about the film spool contained within the film cartridge;
  (b) second sensing means for tracking rotations of the film spool contained within the film cartridge by sensing rotation of the indicator;
  (c) first initiating means for activating said second sensing means to start tracking rotations of the film spool by sensing rotation of the indicator when said first sensing means detects the leading edge of the film; and
  (d) second means (i) for determining when said second sensing means tracks a predetermined number of rotations of the film spool after said second sensing means becomes activated by said first initiating means and (ii) thereafter for initiating a predetermined sequence to park the film spool contained within the film cartridge at a predetermined position of the indicator sensed by said second sensing means.

2. Apparatus as set forth in claim 1, wherein said film cartridge further comprises visual exposure icons visible on the exterior of the film cartridge and the predetermined parking sequence comprises aligning the indicator on the film spool with the appropriate visual icon according to the exposure condition of the film.

3. Apparatus as set forth in claim 1, wherein said film cartridge further comprises visual processed icon visible on the exterior of the film cartridge and the predetermined parking sequence comprises setting the indicator on the film spool according to whether the film has been processed.

4. Apparatus as set forth in claim 1, wherein said second means is a microprocessor.

5. Apparatus as set forth in claim 1, wherein said first initiating means is a microprocessor.

6. A method for use during rewinding of film about a film spool contained within a film cartridge, the film spool comprising an indicator rotatable with the spool and visible from an exterior of the cartridge, the method comprising steps of:

(a) detecting a leading edge of the film during the rewinding of the film;
  (b) waiting a predetermined number of rotations of the film spool, by sensing rotation of the indicator on the spool after the film leader has been detected; and
  (c) initiating a predetermined sequence to park the film spool at a predetermined position of the indicator, after the film spool has rotated said predetermined number of rotations.

7. A method as set forth in claim 6, wherein the film cartridge further comprises visual exposure icon openings on the exterior of the film cartridge and the predetermined parking sequence comprises the step of aligning the indicator on the film spool with the appropriate visual exposure icon opening according to the exposure condition of the film.

8. A method for use in a photographic system comprising a loading chamber for receiving a film cartridge having a film spool, the film spool comprising an indicator rotatable with the spool and visible from an exterior of the cartridge, a film path adjacent to said loading chamber, a metering sensor disposed adjacent to and along said film path, an indicator sensor disposed adjacent to said loading chamber for sensing rotation of the indicator, said method comprising:

(a) employing said metering sensor to detect a leading edge of a film during rewinding of the film about the film spool contained within the film cartridge;
  (b) employing said indicator sensor to track the number of film spool rotations after detection of said leading edge;
  (c) initiating a predetermined film spool parking sequence after tracking a predetermined number of film spool rotations; and
  (d) then parking the film spool within the cartridge at a predetermined position of the indicator sensed by said indicator sensor.

9. A method as set forth in claim 8, wherein the film cartridge further comprises icon openings on the exterior of the film cartridge and the predetermined film spool parking sequence comprises aligning the visual indicator on the film spool with the appropriate icon opening.

* * * * *

UNITED STATES PATENT AND TRADEMARK OFFICE
CERTIFICATE OF CORRECTION

PATENT NO. : 5,614,971
DATED : March 25, 1997
INVENTOR(S) : Beth A. O'Leary

It is certified that error appears in the above-indentified patent and that said Letters Patent is hereby corrected as shown below:

Title page, Item [56]  -- Please add to "Item (56) References Cited", the Supplemental list of art cited in Form PTO-1449

US PATENT DOCUMENTS 4,641,935   2/10/87   Umezu et al   354 173.11
5,341,187   8/23/94   Kurei         354 173.1

FOREIGN PATENT DOCUMENTS

JP-A-07 013236   1/17/95   Japan   G03 B   --

Signed and Sealed this

Fifteenth Day of July, 1997

Attest:

BRUCE LEHMAN

Attesting Officer

Commissioner of Patents and Trademarks